(12) United States Patent
Berglund et al.

(10) Patent No.: US 6,334,483 B1
(45) Date of Patent: Jan. 1, 2002

(54) SUPPORT PLATE FOR TUBE HEAT EXCHANGERS AND A TUBE HEAT EXCHANGER

(75) Inventors: Göran Berglund, Sandviken; Ulf Eriksson, Gothenburg, both of (SE)

(73) Assignee: Edmeston AB, Gothenburg (SE)

( * ) Notice: Subject to any disclaimer, the term of this patent is extended or adjusted under 35 U.S.C. 154(b) by 0 days.

(21) Appl. No.: 09/284,440

(22) PCT Filed: Oct. 13, 1997

(86) PCT No.: PCT/SE97/01712

§ 371 Date: Jul. 14, 1999

§ 102(e) Date: Jul. 14, 1999

(87) PCT Pub. No.: WO98/16792

PCT Pub. Date: Apr. 23, 1998

(30) Foreign Application Priority Data

Oct. 14, 1996 (SE) .................................................. 9603739

(51) Int. Cl.[7] .................................. F28F 19/00; F28F 9/02
(52) U.S. Cl. ............................................ 165/134.1; 165/135
(58) Field of Search ................................ 165/134.1, 158, 165/135

(56) References Cited

U.S. PATENT DOCUMENTS

| | | | | | |
|---|---|---|---|---|---|
| 2,145,877 A | * | 2/1939 | Houdry | .................. | 165/134.1 X |
| 2,615,688 A | * | 10/1952 | Brumbaugh | ........... | 165/134.1 X |
| 2,743,089 A | * | 4/1956 | Gardneer et al. | ..... | 165/134.1 X |
| 2,834,581 A | * | 5/1958 | Schefels et al. | ....... | 165/134.1 X |
| 2,915,295 A | * | 12/1959 | Boni, Jr. | .................... | 165/134.1 |
| 3,001,766 A | * | 9/1961 | Laist | ......................... | 165/135 X |
| 3,026,256 A | * | 3/1962 | Liljeblad et al. | ...... | 165/134.1 X |
| 3,029,796 A | * | 4/1962 | Simmons et al. | ..... | 165/134.1 X |
| 3,114,415 A | * | 12/1963 | Wintzer | ................. | 165/134.1 X |
| 3,185,210 A | * | 5/1965 | Kuhne et al. | .............. | 165/134.1 |
| 3,442,060 A | * | 5/1969 | Guillot et al. | ......... | 165/134.1 X |
| 3,863,708 A | * | 2/1975 | Grimes | .................. | 165/134.1 X |
| 4,182,408 A | * | 1/1980 | Laber | ..................... | 165/134.1 X |
| 4,401,153 A | * | 8/1983 | Marsch et al. | ............. | 165/134.1 |
| 5,035,283 A | | 7/1991 | Brücher et al. | | |
| 5,472,046 A | | 12/1995 | Brücher et al. | | |
| 5,570,741 A | * | 11/1996 | Brucher et al. | ........... | 165/134.1 |
| 5,826,647 A | * | 10/1998 | Engelhardt et al. | ....... | 165/134.1 |
| 5,866,083 A | | 2/1999 | Berglund et al. | | |

FOREIGN PATENT DOCUMENTS

| | | | | |
|---|---|---|---|---|
| DE | 1 601 214 | | 5/1970 | |
| FR | 1 587 296 | | 3/1970 | |
| JP | 55-43354 | * | 3/1980 | ................ 165/134.1 |

* cited by examiner

Primary Examiner—Leonard Leo
(74) Attorney, Agent, or Firm—Burns, Doane, Swecker & Mathis, L.L.P.

(57) ABSTRACT

A tube heat exchanger for the production of carbon black includes a support plate located at the lower end of a space through which heat exchanger tubes extend. The plate includes upper and lower spar support plates forming a spar space therebetween through which the heat exchanger tubes extend. The spar space is divided into a plurality of canals by partition walls. Each canal has its own inlet and outlet for conducting a flow of cooling medium. The flow direction of cooling medium in each canal is opposite that of an adjacent canal. Portions of the support plate are formed of an aluminum-containing, iron-based alloy produced powder-metallurgically.

11 Claims, 6 Drawing Sheets

SUPPORT PLATE FOR TUBE HEAT EXCHANGERS AND A TUBE HEAT EXCHANGER

BACKGROUND OF THE INVENTION

The present invention relates to a support plate for heat exchangers, more specifically for tube heat exchangers with vertical tubes of considerable length, whose weight in combination with high temperatures expose the support plate to considerable stress. In particular, the support plate is useful in tube heat exchangers for the production of carbon black.

Carbon black is the name used for finely divided forms of carbon which are produced by incomplete combustion or thermal decomposition of natural gas or mineral oil. Depending on the method of production, different types of carbon black arise, viz. so called channel black, furnace black and thermal black (also called pyrolysis black). Furnace black is clearly the most important type of carbon black and it is used to a considerably larger extent than the other two. Also the present invention is related to specifically this type of carbon black, which in the present application is simply called "carbon black".

FIG. 1A illustrates a conventional plant for the production of carbon black (i.e., of the type furnace black). Incoming combustion air flows through a tube conduit 1 into the upper part of a tube heat exchanger 2, in which it is preheated before the consecutive combustion of oil in the burner 9 and the combustion reactor 3. The thus preheated air is led into the combustion chamber via a conduit 5. Oil is added to said reactor via a tube conduit 4. The amount of air corresponds to about 50% of the stoichiometric amount of oxygen for a complete combustion of the oil, carbon black thereby being created. Possibly, water is also added to the reactor, which has an impact on the quality of the final product. The mixture of suspended carbon black in consumed combustion air is led away from the top of the heat exchanger via a conduit 6, through a normally water-cooled cooler 7 to a filter plant 8, normally provided with textile trapping filters. In this filter plant, the carbon black is filtered off from the gas stream, which is then led out via a nonreturn valve 16 for further purification in a plant 11, before it is let out into the free air through a chimney 12.

The construction of the conventional heat exchanger 1B may be seen more clearly in FIG. 2. The heat exchanger is of a tube type and comprises a plurality of substantially vertical tubes 13. Inside these tubes rise the hot gasses from the combustion, whereby they are cooled by the air that enters via the inlet 1 and passes outside the tubes 13 downwardly towards the outlet 5, enclosed by the shell 14. In order to increase the heat transfer, the air entering through the inlet 1 is given a reciprocating motion by arranging a plurality of substantially horizontal baffles 15. These consist of metal sheets that extend to about ¾ of the diameter of the heat exchanger chamber, each baffle plate being provided with a number of apertures for accomodating the tubes 13. The temperature at the inlets of the heat exchanger tubes 13 may be about 1000° C. and the air that flows into the inlet 1 may be heated to about 800° C. These conditions involve an extremely severe stress for the materials in the heat exchanger. The part of the heat exchanger that is exposed to the highest mechanical stress is the lower part of the shell and the support plate, where the metal temperature may amount to about 900° C. Thus, at an internal pressure of about 1 bar at said temperature, a shell diameter of about 2000 mm, a number of tubes of between 50 and about 150, and a tower height of about 13 m, it is easily understood that the support plate must endure extremely large stresses, particularly in view of the fact that the tubes 13 rest with their whole weights upon the support plate. The corresponding problem for the shell 14 has been solved by our previous Swedish patent application 9504344-4, which is hereby incorporated by this reference. According to said patent application, the heat exchanger comprises a further shell wall, which is substantially cylindrical and placed inside and substantially concentrically with the outer shell wall, so that a substantially cylindrical gap space, that is open at both ends, is formed between the two shell walls, the gas flowing into the inlet passing this gap space before it comes into contact with the heat exchanger tubes. It has sometimes occurred that the support plate has yielded to the large load, with very high repairing costs as a consequence.

Attempts have been made to cool the support plate by means of double bottom constructions in accordance with FIG. 2. According to this construction, a portion of the air entering the inlet 1 is passed off into a stand tube 17 and down into the double support plate 18, which comprises an upper heat-insulated wall 19 and a lower heat-insulated wall 20, so that a cavity 21 is formed therebetween. The air from the stand tube 17 flows into the cavity 21, whereby it cools the support plate, and then the air flows out through the outlet tubes 22 and is returned to the heat exchanger. However, this construction has not turned out to be sufficiently efficient, since it does not cool the support plate sufficiently.

Thus, the object of the present invention is to provide a support plate in a tube heat exchanger, which plate withstands the large load and the high stress that such a plate is forced to sustain.

SUMMARY OF THE INVENTION

This and other objects have been attained in a surprising way by providing a support plate that comprises an upper spar support plate, a lower spar support plate, and a spar space formed between those plates. Heat exchanger tubes extend through the support plate. Inlets and outlets are connected to the spar space for conducting a cooling medium therethrough. The spar space is divided into a plurality of adjacent canals by partition walls. Each canal is provided with one of the inlets and one of the outlets and is intersected by a plurality of the heat exchanger tubes which pass through the spar space.

The invention also pertains to a tube heat exchanger for the production of carbon black, the heat exchanger employing the above-described support plate.

BRIEF DESCRIPTION OF THE DRAWINGS

For illustrative but not limiting purposes, a preferred embodiment of the invention will now be further described with reference to the appended drawings. These are herewith briefly presented.

DETAILED DESCRIPTION OF A PREFERRED EMBODIMENT OF THE INVENTION

Figure 1A:
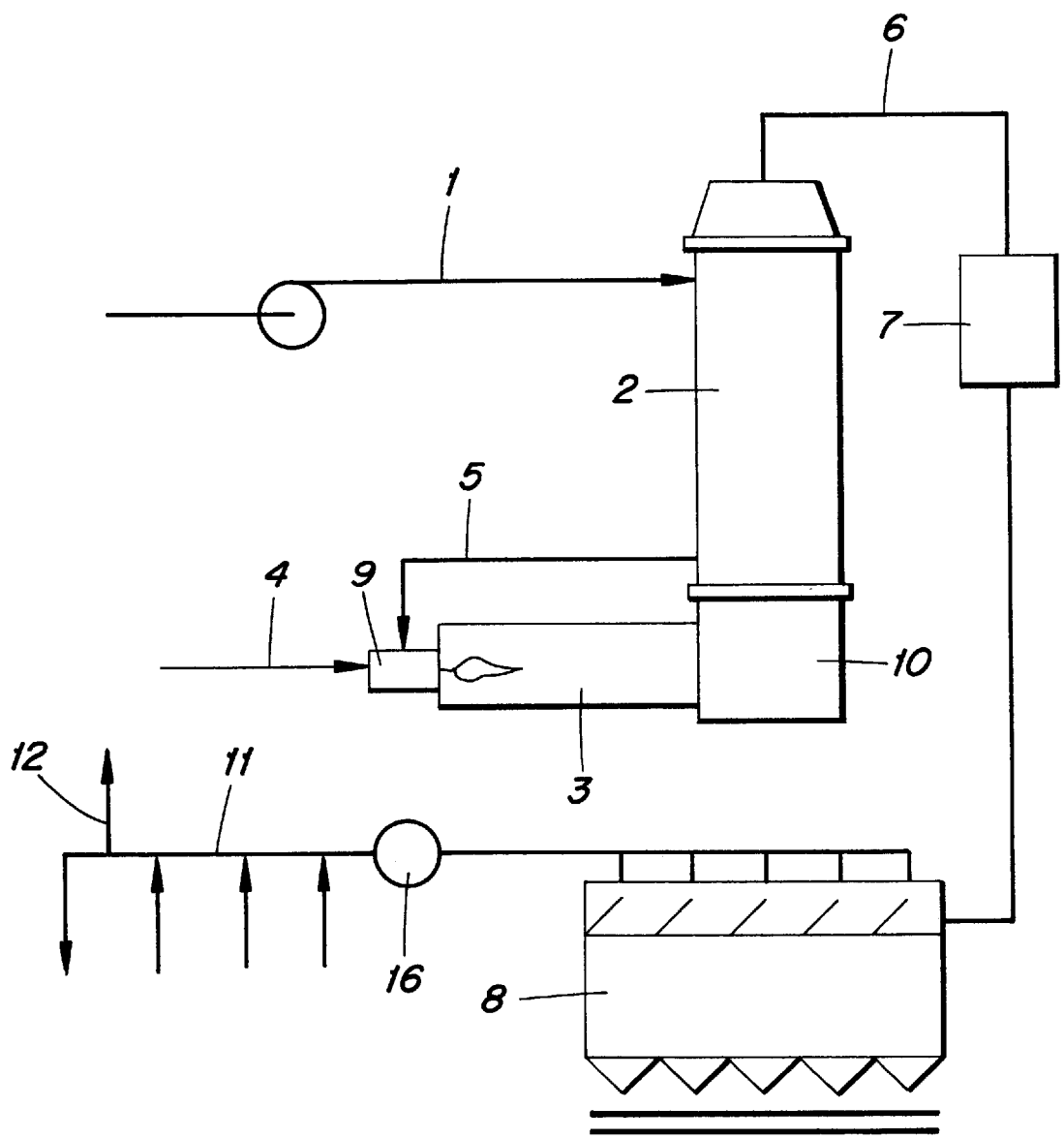
FIG. 1A shows schematically a conventional plant for the production of carbon black, as already described above.
Figure 2:
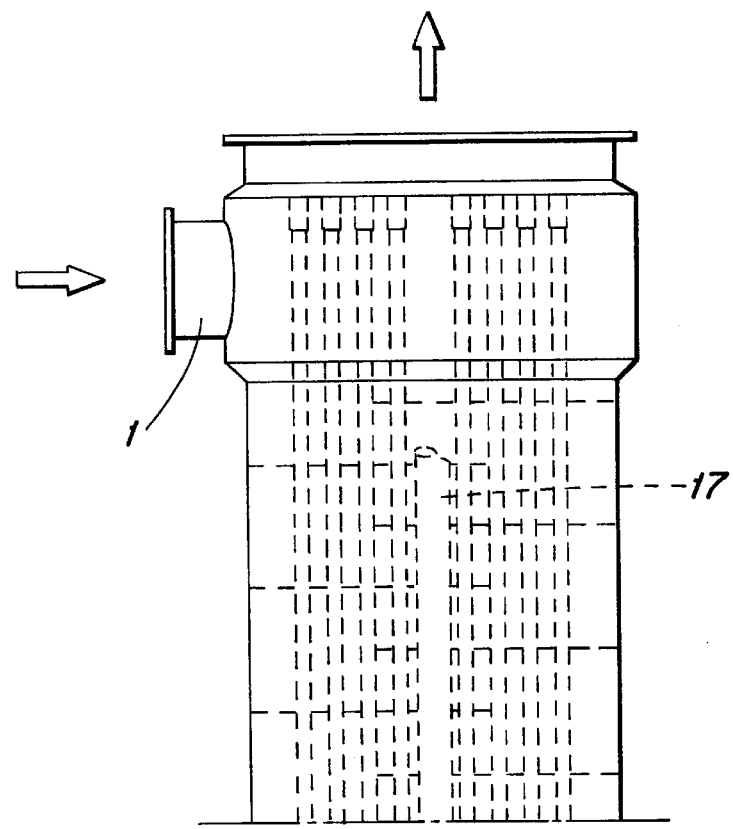
FIG. 2 also shows a heat exchanger according to the state of the art, as already described above.
Figure 2:
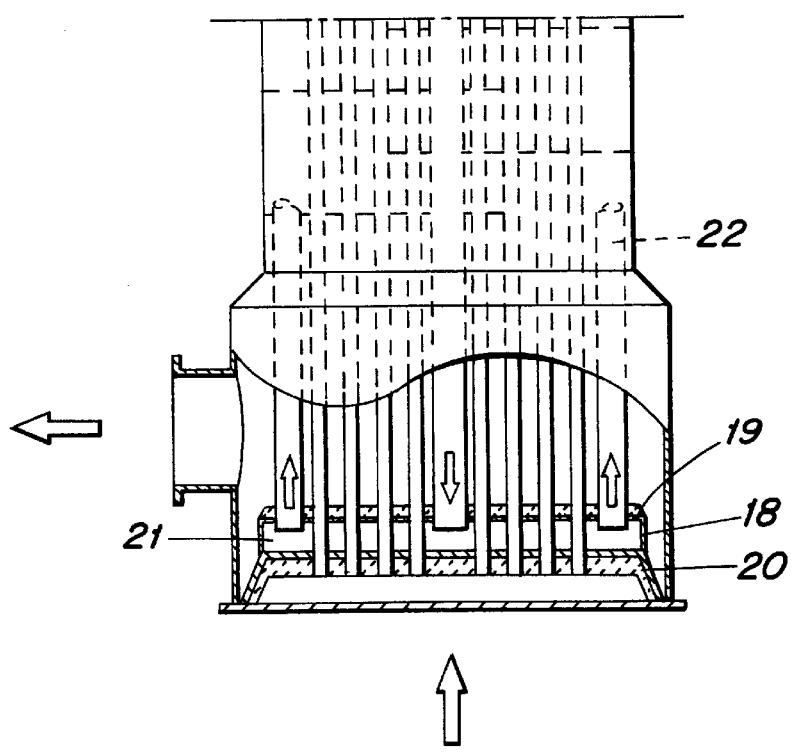
Figure 3:
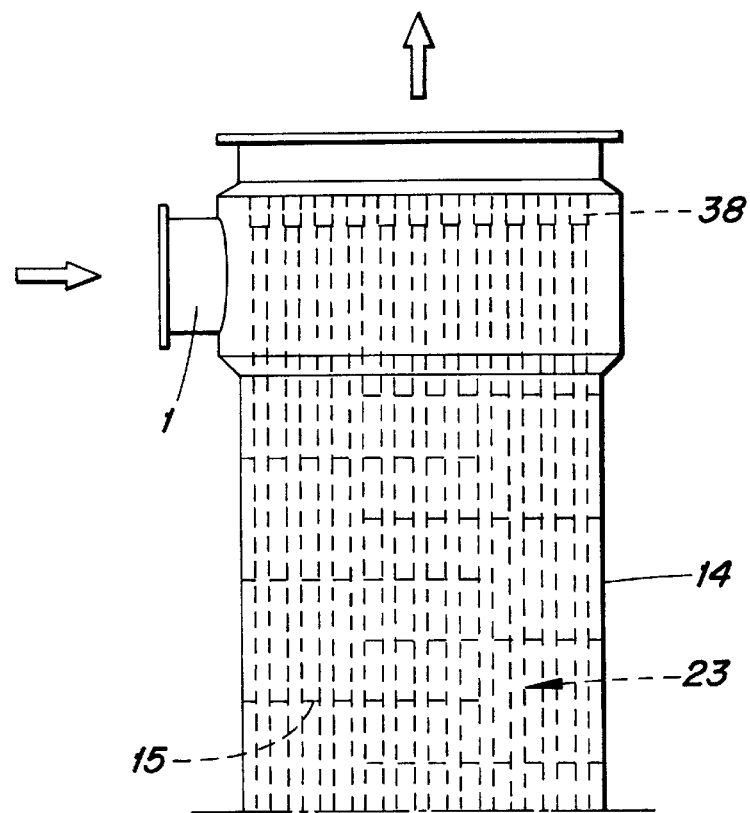
FIG. 3 shows a frontal view of a heat exchanger according to the invention, partly in cross-section.
Figure 3:
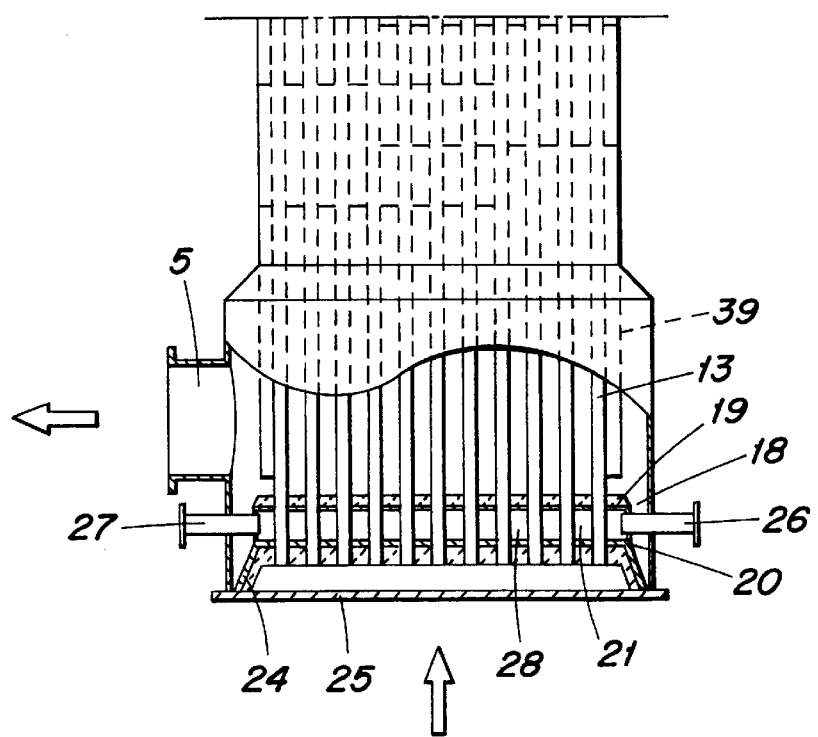

FIG. 3 shows a tube heat exchanger constructed according to the invention, which may advantageously be used in a plant for the production of carbon black according to FIG. 1A. It comprises an inlet 1 for ambient air which flows on the outside of the tubes 13 and out through the outlet 5, from where it flows further to a combustion chamber. In front of the outlet 5, there may be mounted a shield 39, for a more even distribution of the outflowing air. At the top, the tubes are accommodated in sealing compensators or sleeves 38, which allow a certain motion with regard to the reoccurring contractions and heat expansions, respectively, of the tubes. Furthermore, baffles 15 may be provided, in the same way as in FIG. 1B and 2. Suitably, the air entering through the inlet 1 has a temperature from ambient temperature to about 100° C. The heat exchanger comprises a shell 14 of a substantially circular cross-section. which comprises a chamber 23. The heat exchanger often has considerable dimensions, such as a diameter of about 2 m and a height of between 10 and 15 m, and it encloses between 50 and 150 tubes. At the top, the heat exchanger is connected to a conduit 6 (see FIG. 1A) via a gable wall (not shown). At the bottom, the heat exchanger is delimited by a substantially round support plate according to the present invention, which comprises an upper heat-insulated spar support plate 19 and a lower heat-insulated spar support plate 20. Between these there is a spar space 21. Both spar support plates are heat-insulated by means of a suitable insulation material, such as for instance a ceramic mass. Through the spar space 21 flows a suitable cooling medium, such as air, that is allowed to pass through the spar support plate in order to cool the heat exchanger as much as possible and to avoid too strong a heating from the very hot evaporation chamber 10 (see FIG. 1A), which has a temperature of about 1000° C. Suitably, the lower spar support plate 20 comprises a base part 24, which is fastened on the lower end plate 25 or on the evaporation chamber. Both the upper plate 19 and the lower plate 20 are provided with a number of interfacingly located apertures for the accomodation of the heat exchanger tubes 13, the latter thus extending through the support plate and its spar space 21.

Figure 4:
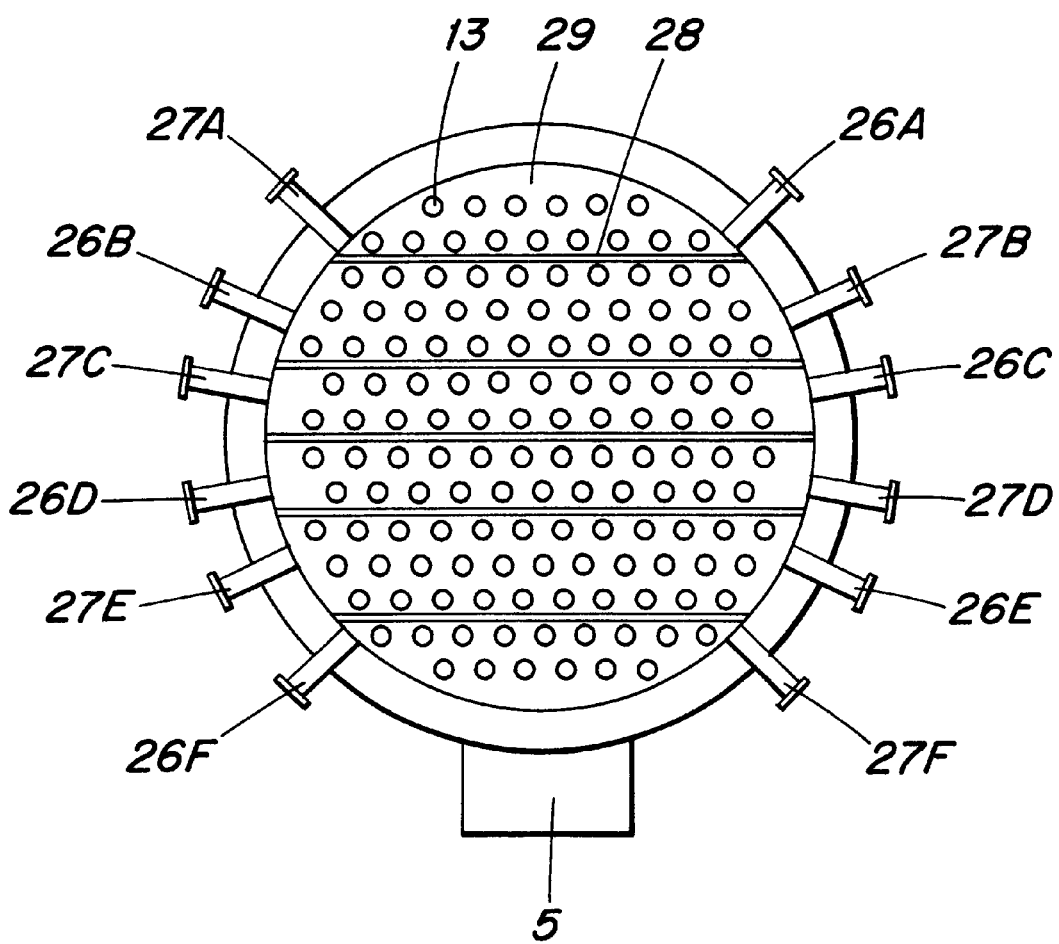
FIG. 4 shows a horizontal cross-section of the support plate according to the invention, straight from above.

Further, the support plate according to the present invention comprises a plurality of connection pieces, namely cooling medium inlets 26 and cooling medium outlets 27, the cooling medium suitably being air, and a number of intermediate or partition walls 28, which may be seen more clearly in FIG. 4. These partition walls 28 are substantially airtight and imperforated and divide the spar space 21 into a plurality of mutually separated part chambers or canals 29, a number of heat exchanger tubes 13 being in each one of the canals 29. These partition walls 28 fulfil a double function that is characteristic for the present invention: on one hand they improve the cooling effect of the cooling medium that enters into the inlets 26 and flows out through the outlets 27, and on the other hand they contribute significantly to the supporting and staying of the entire support plate 18. Suitably, the inlets 26 may be connected to a common inlet manifold and the outlets to a common outlet manifold. In order to increase the percolation through the canals 29, the air that comes in through the inlets 26 may be pressed forwards by means of an externally mounted fan, In order to minimize the temperature differences in the support plate, the inlets 26A–F and the outlets 27A–F, respectively, of adjacent canals 29 are preferably arranged at opposite sides of the canals. Thus, it may be clearly seen in FIG. 4 that on either canal side, every second connection piece is an inlet 26 and every second connection piece is an outlet 27.

Figure 5:
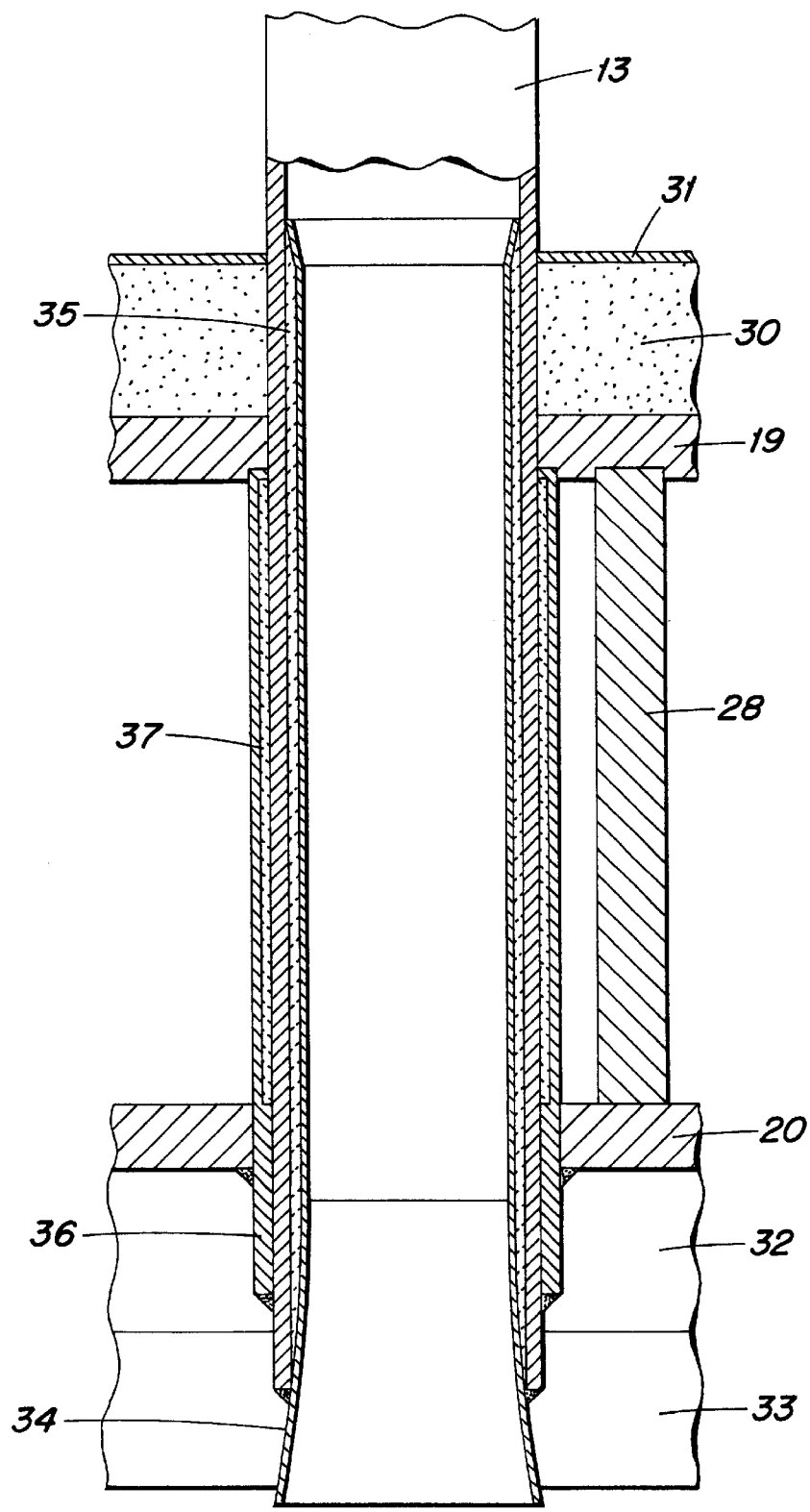
FIG. 5 shows a so called ferrule, which is mounted in the support plate according to the invention.

FIG. 5 shows more in detail the construction of how a heat exchanger tube 13 extends through a support plate according to the invention. The upper spar plate is designated 19 and the lower 20, and between these is provided a partition wall 28. Above the spar plate 19 is provided an insulation material 30 and a thinner protection sheet 31 for protecting the insulation. Also below the lower spar plate 20 an insulation is provided, viz. a first layer 32 and a second layer 33, suitably of ceramic materials. If so desired, these may be kept in place by means of a heat-resisting protective sheet below the layer 33.

In the lowermost part of a tube 13 is a protective tube or a so called ferrule 34 for the inflow of very hot gasses. The ferrule has the function of preventing the aggressive gas from coming into contact with the tube 13 and the carrying parts of the lower spar plate, and of limiting the heat absorption in the support plate by insulation. Between this ferrule 34 and the tube 13 is an intermediate insulation 35. In order to provide place for this insulation 35, the ferrule 34 has widening openings at both ends.

Furthermore, there is arranged a protective sleeve 36 outside the tube 13, which sleeve extends from the upper plate 19 to and past the lower plate 20. Preferably, there is an insulation 37 between the sleeve 36 and the tube 13. All mentioned metal pieces are welded together.

By the construction with partition walls and canals, temperatures as low as 300° C. have been measured, compared to previous 600° C. or higher.

Figure 1B:
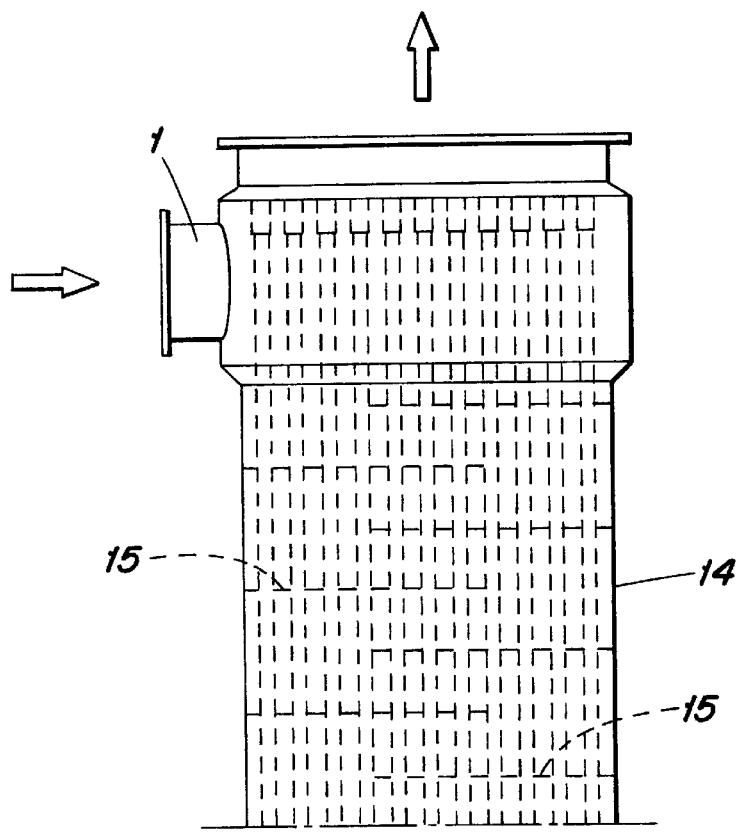
FIG. 1B shows a heat exchanger according to the state of the art, as already described above.
Figure 1B:
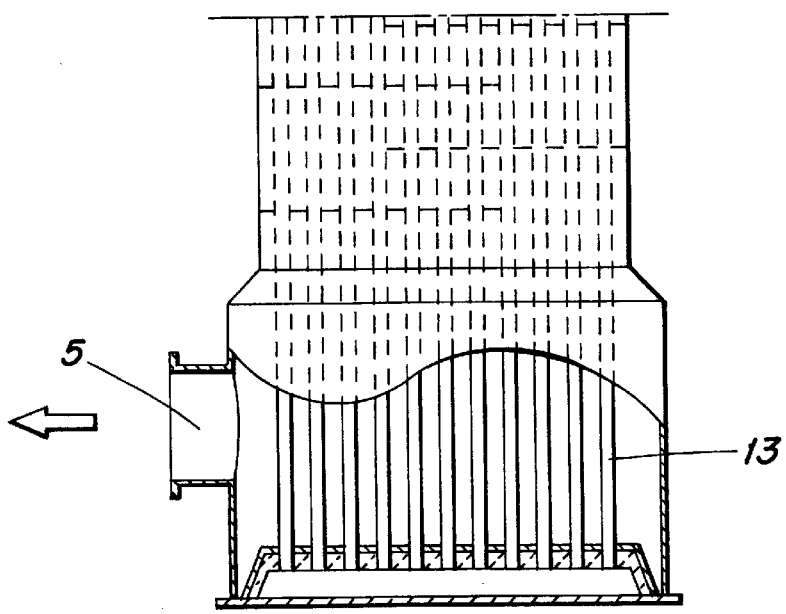

The shell wall 14 may be simple, as in FIG. 1B, or double, in accordance with the disclosure of the Swedish patent application 9504344-4.

Traditionally, austenitic stainless steels are used for the tubes as well as the ferrules. These steels have a good creep strength and may have a satisfactory resistance to acierage. However, in high-sulphur combustion environments the resistance is unsatisfactory. Sulphuration has many times restricted the useful life of the ferrules and the tubes at the highest temperatures of the gas, at simultaneous high sulphur contents in the oil. By working at high temperatures at the same time as there are high sulphur concentrations, the problems are accentuated. Traditionally, ferritic stainless steels have good resistance to sulphur-containing environments, but have the disadvantage of a low creep strength.

It has now emerged that the creep strength of ferritic stainless steels is improved if the production is made powder-metallurgically. Moreover, aluminum-alloyed ferritic stainless steels produced by powder metallurgy combine the desired properties with an extremely stable oxide on the surface, and at the same time with an acceptably high creep strength. Thus, it has emerged that a very suitable material for the severely exposed details is an iron-based alloy comprising 10–40% by weight of chromium, 2–10% by weight of aluminum, maximally 5% by weight of one or several of cobalt, nickel, silicon, manganese, zirkonium and titanium, however in total maximally 10% by weight, less than a totally 2% by weight of additives of nitrogen, carbon and/or yttrium, hafnium and metals of the group rare earth metals, and moreover, 0,02–0,1% by weight of bound oxygen in the form of oxides or other refractory compounds, the rest being iron, the oxides being in the form of particles evenly dispersed in the material, with an average diameter of 100–300 nm, and the grains in the metallic phase being substantially equiaxial. After machining to, e.g., belts or tubes, and a heat treatment at least 1050° C., the iron-based alloy contains very elongated grains with a length of at least 5 mm and a relation of length to cross-area of at least 10:1. These alloys are further described in SE-B-467 414, whose disclosure is hereby incorporated by this reference. Thus, according to a preferred embodiment of this invention, all details that are exposed to high temperatures and to high mechanical stress are made of the above mentioned group of materials. Hence, these details comprise some or all of the elements in the support plate, in particular the ferrules 34 and the lower part of the tubes 13.

We claim:

1. In combination, a support plate and heat exchanger tubes for a tube heat exchanger, the support plate comprising an upper spar support plate, a lower spar support plate and a spar space formed between these plates, through which support plate the heat exchanger tubes extend, inlets and outlets being provided to the spar space for conducting a cooling medium, the spar space being divided into a plurality of adjacent canals by partition walls, each canal being provided with one of the inlets and one of the outlets, and each canal being intersected by a plurality of the heat exchanger tubes passing through the spar space, a portion of each heat exchanger tube passing completely through its respective canal, such portion being surrounded circumferentially by a heat-insulative material, wherein the inlet and outlet of each canal are arranged reversely with respect to the inlet and outlet of an adjacent canal, whereby a flow of cooling medium through each canal is opposite to a flow of cooling medium through an adjacent canal.

2. The combination according to claim 1 wherein at least one of the upper a lower spar plates is covered by a heat-insulating material.

3. The combination according to claim 1 wherein each of the upper and lower plates is covered by a heat-insulating material.

4. The combination according to claim 1 wherein the heat-insulative material comprises a tubular insert disposed inside of each of the sections, a sleeve extending around each of the sections, heat-insulation disposed between the tube and the tubular insert, and heat-insulation disposed between the tube and sleeve.

5. The combination according to claim 1 wherein the tubular inserts and at least lower portions of the tubes comprise an aluminum-containing iron-based alloy produced powder-metallurgically.

6. The combination according to claim 5 wherein the alloy comprises 10–40% by weight of chromium, 2–10% by weight of aluminum, maximally 5% by weight of one or several of cobalt, nickel, silicon, manganese, zirconium and titanium, however in total maximally 10% by weight, less than totally 2% by weight of additives of nitrogen, carbon and/or yttrium, hafnium and metals of the group rare earth metals, and moreover, 0.02–0.1% by weight of bound oxygen in the form of oxides or other refractory compounds, the rest being iron, the oxides being in the form of particles evenly dispersed in the material, with an average diameter of 100–300 nm, and the grains in the metallic phase being substantially equi-axial.

7. The combination according to claim 1 wherein at least lower portions of the tubes comprise an aluminum-containing, iron-based alloy produced powder metallurgically.

8. A tube heat exchanger for producing carbon black, comprising:

a substantially cylindrical outer shell wall enclosing a substantially cylindrical space;

a pair of end walls closing respective ends of the space;

a plurality of heat exchanging tubes extending through the space from one end wall to the other; the space including a gas inlet and a gas outlet for conducting a gas through the space in heat exchanging relationship with the outside surfaces of the tubes;

a support plate disposed at a lower end of the space, the support plate comprising:
an upper spar support plate,
a lower spar support plate,
a spar space formed between the upper and lower spar plates, with the tubes arranged to pass through the upper and lower spar plates and through the spar space,
a plurality of partition walls disposed in the spar space and dividing the spar space into a plurality of canals, a plurality of the tubes passing through each canal; and
an inlet and an outlet associated with respective ends of each canal for conducting a cooling medium therethrough;
a portion of each heat exchanger tube passing completely through its respective canal, such portion being surrounded circumferentially by a heat-insulative material,
wherein the inlet and outlet of each canal are arranged reversely with respect to the inlet and outlet of an adjacent canal, whereby a flow of cooling medium through each canal is opposite to a flow of cooling medium through an adjacent canal.

9. The tube heat exchanger according to claim 8 wherein at least a lower portion of each tube comprises an iron-based alloy containing 10–40% by weight of C+, 2–10% by weight of Al, and the remainder being substantially iron.

10. The tube heat exchanger according to claim 8 wherein the lower portion of each tube comprises ferritic stainless steel of 10–40% by weight Cr, 2–10% by weight Al, and the rest substantially iron, the ferritic stainless steel produced powder metallurgically.

11. The tube heat exchanger according to claim 8 wherein at least a lower portion of each tube is clad internally by an iron-based alloy comprising 10–40% by weight of chromium, 2–10% by weight of aluminum, maximally 5% by weight of one or several of cobalt, nickel, silicon, manganese, zirconium and titanium, however in total maximally 10% by weight, less than totally 2% by weight of additives of nitrogen, carbon and/or yttrium, hafnium and metals of the group rare earth metals, and moreover, 0.02–0.1% by weight of bound oxygen in the form of oxides or other refractory compounds, the rest being iron, the oxides being in the form of particles evenly dispersed in the material, with an average diameter of 100–300 nm, and the grains in the metallic phase being substantially equi-axial.

* * * * *